United States Patent [19]

Gottlieb et al.

[11] Patent Number: 5,892,822
[45] Date of Patent: Apr. 6, 1999

[54] METHOD OF AND SYSTEM FOR CALL ROUTING COMPLIANT WITH INTERNATIONAL REGULATORY ROUTING REQUIREMENTS

[75] Inventors: Louis G. Gottlieb; William A. Sims; Steven P. Higgins, all of Colorado Springs, Colo.; Randall P. Ethier, Herndon, Va.

[73] Assignee: MCI Communications Corporation, Washington, D.C.

[21] Appl. No.: 777,752

[22] Filed: Dec. 30, 1996

[51] Int. Cl.$^6$ ........................................................ H04M 7/00
[52] U.S. Cl. ........................... 379/220; 379/115; 379/207; 379/221
[58] Field of Search ..................... 379/114, 115, 379/201, 207, 219, 220, 221, 229, 230

[56] References Cited

U.S. PATENT DOCUMENTS

| | | | |
|---|---|---|---|
| 4,555,594 | 11/1985 | Friedes et al. | 379/207 |
| 4,565,903 | 1/1986 | Riley | 379/220 |
| 4,577,066 | 3/1986 | Bimonte et al. | 379/221 |
| 5,163,042 | 11/1992 | Ochiai | 379/220 |
| 5,311,585 | 5/1994 | Armstrong et al. | 379/220 |
| 5,333,185 | 7/1994 | Burke et al. | 379/207 |
| 5,406,620 | 4/1995 | Pei | 379/220 |
| 5,408,526 | 4/1995 | McFarland et al. | 379/202 |
| 5,420,914 | 5/1995 | Blumhardt | 379/115 |
| 5,465,293 | 11/1995 | Chiller et al. | 379/207 |
| 5,475,749 | 12/1995 | Akinpelu et al. | 379/207 |
| 5,506,894 | 4/1996 | Billings et al. | 379/207 |
| 5,550,909 | 8/1996 | Chanda et al. | 379/201 |
| 5,550,912 | 8/1996 | Akinpelu et al. | 379/221 |
| 5,661,792 | 8/1997 | Akinpelu et al. | 379/207 |
| 5,757,894 | 5/1998 | Key et al. | 379/207 |
| 5,764,749 | 6/1998 | Zelazny et al. | 379/115 |
| 5,781,620 | 7/1998 | Montgomery et al. | 379/229 |

*Primary Examiner*—Scott Wolinsky

[57] ABSTRACT

A method of and system for routing switched termination telephone calls in accordance with international routing requirements and with consideration of available network capacity. A call is received at a switch of an international carrier. The switch sends a query identifying the first country as the country of origin for the call and the second country as the country of termination for the call to a service control point of the international carrier. The service control point determines from the query that the call is an international call and sends a request for a routing translation to a regulatory routing platform of the international carrier. The regulatory routing platform determines an optimal route for the call in accordance with international regulatory routing requirements.

21 Claims, 12 Drawing Sheets

| Orig Country | Access Type | Terminating Country/Egress Type ||||||||||
|---|---|---|---|---|---|---|---|---|---|---|---|
| | | United States || United Kingdom || Japan || Germany || Australia ||
| | | Ded | Sw | Ded | Sw | Ded | Sw | Ded | Sw | Ded | Sw |
| United States | Ded | VPN | VPN | L-N-L<br>P-N-L | L-N-TO<br>P-N-TO | L-N-L<br>P-C | L-C<br>P-N-[Aus] | L-N-L<br>P-C | L-C<br>P-C | L-N-L<br>P-C | L-C<br>P-C |
| | Sw | VPN | VPN | L-N-L<br>P-N-L | L-N-TO<br>P-N-TO | L-N-L<br>P-C | L-C<br>P-C | L-N-L<br>P-C | L-C<br>P-C | L-N-L<br>P-C | L-C<br>P-C |
| United King. | Ded | L-N-L<br>P-N-L | L-N-TO<br>P-N-TO | L-N-L<br>P-N-L | L-N-TO<br>P-N-TO | L-N-L<br>P-C | L-C<br>P-C | L-N-L<br>P-N-L | L-N-TO<br>P-N-TO | L-N-L<br>P-N-L | L-N-TO<br>P-N-TO |
| | Sw | L-N-L<br>P-N-L | L-N-TO<br>P-N-TO | L-N-L<br>P-N-L | L-N-TO<br>P-N-TO | L-N-L<br>P-C | L-C<br>P-C | L-N-L<br>P-N-L | L-N-TO<br>P-N-TO | L-N-L<br>P-N-L | L-N-TO<br>P-N-TO |
| Japan | Ded | L-N-L<br>P-C | L-C<br>P-C | L-N-L<br>P-C | L-C<br>P-C | L-N-L<br>P-C | L-C<br>P-C | L-N-L<br>P-C | L-C<br>P-C | L-N-L<br>P-C | L-C<br>P-C |
| | Sw | L-N-L<br>P-C | L-C<br>P-C | L-N-L<br>P-C | L-C<br>P-C | L-N-L<br>P-C | L-C<br>P-C | L-N-L<br>P-C | L-C<br>P-C | L-N-L<br>P-C | L-C<br>P-C |
| Germany | Ded | L-N-L<br>P-C | L-C<br>P-C | L-N-L<br>P-N-L | L-N-TO<br>P-N-TO | L-N-L<br>P-C | L-C<br>P-C | L-N-L<br>P-N-L | L-N-TO<br>P-N-TO | L-N-L<br>P-N-L | L-N-TO<br>P-N-TO |
| | Sw | L-N-L<br>P-C | L-C<br>P-C | L-N-L<br>P-N-L | L-N-TO<br>P-N-TO | L-N-L<br>P-C | L-C<br>P-C | L-N-L<br>P-N-L | L-N-TO<br>P-N-TO | L-N-L<br>P-N-L | L-N-TO<br>P-N-TO |
| Australia | Ded | L-N-L<br>P-C | L-C<br>P-C | L-N-L<br>P-N-L | L-N-TO<br>P-N-TO | L-N-L<br>P-C | L-C<br>P-C | L-N-L<br>P-N-L | L-N-TO<br>P-N-TO | L-N-L<br>P-N-L | L-N-TO<br>P-N-TO |
| | Sw | L-N-L<br>P-C | L-C<br>P-C | L-N-L<br>P-N-L | L-N-TO<br>P-N-TO | L-N-L<br>P-C | L-C<br>P-C | L-N-L<br>P-N-L | L-N-TO<br>P-N-TO | L-N-L<br>P-N-L | L-N-TO<br>P-N-TO |

FIG. 5

METHOD OF AND SYSTEM FOR CALL ROUTING COMPLIANT WITH INTERNATIONAL REGULATORY ROUTING REQUIREMENTS

FIELD OF THE INVENTION

The present invention relates generally to methods of and systems for routing telephone calls, and more particularly to a method of and system for optimal routing of international telephone calls and in-country switched termination calls in accordance with international regulatory requirements and network capacity.

DESCRIPTION OF THE PRIOR ART

The global telecommunications industry has created opportunities for international carriers (INC). INCs carry voice and data traffic for customers across international boundaries and, to a lesser extent, within countries. An INC network picks up a customer call in one country, either directly from the customer or from a local carrier, and delivers the call to a customer or a local carrier in the destination country.

Recent developments in the international telecommunications environment have introduced a new set of requirements for call routing. International Simple Resell (ISR) agreements among various countries have been made that dictate the type of network facilities and carriers that must be used when transporting a call between and within countries. These ISR agreements result in the need for an INC to employ an advanced call processing platform to ensure that international calls are routed to comply with the regulatory routing requirements, while maintaining optimal efficiency in call routing.

Optimally, an INC will route the call in a manner that utilizes the INC's private network to the maximum extent allowed under the regulatory routing requirements. These requirements will dictate whether call transport is to be performed by the INC or a correspondent network.

Therefore, an INC needs to employ a system that will automatically determine, in real-time and on a call-by-call basis, the optimal route for a call in compliance with regulatory routing requirements.

SUMMARY OF THE INVENTION

A method for optimizing the routing of a call while meeting the regulatory routing requirements set forth in International Simple Resell (ISR) agreements is provided through use of an enhanced call processing platform. Optimization is in terms of network costs, and is achieved by determining the longest route on which a call can be transported on a carrier's private network. This determination is made based on regulatory routing requirements and call service type. Examples of call service type include 800, VPN, OS, etc. Use of least cost routing (LCR) algorithms, such as time-of-day routing and call percent allocation, may be incorporated as secondary considerations. During periods of network capacity exhaustion, calls to public switched telephone network (PSTN) terminations can be directed off network to free up capacity for direct termination calls.

A conventional network control system (NCS) is used for initial call processing. During call processing, determination that the call is a switched termination call triggers the transfer of call processing to a regulatory routing platform (RRP). The RRP evaluates the call parameters that dictate regulatory routing requirements. These parameters include country of origination, country of destination, type of originating network facility (switched or dedicated), and type of terminating network facility, and call service type (e.g. 800, VPN, OS, etc.). Based on these parameters, the RRP determines the regulatory routing requirements for the call. These requirements include what type of carrier may transport the call across international boundaries.

The RRP then determines the optimal call route in compliance with the regulatory routing requirements. The optimal call route will be that which transports the call on the carrier's private network to the maximum extent allowed under the regulatory routing requirements. If more than one route is available that provides the maximum private network transport, then secondary LCR criteria may be applied.

BRIEF DESCRIPTION OF THE DRAWINGS

FIG. 5 illustrates a regulatory routing matrix table according to the present invention.

DESCRIPTION OF THE PREFERRED EMBODIMENT

Figure 1:
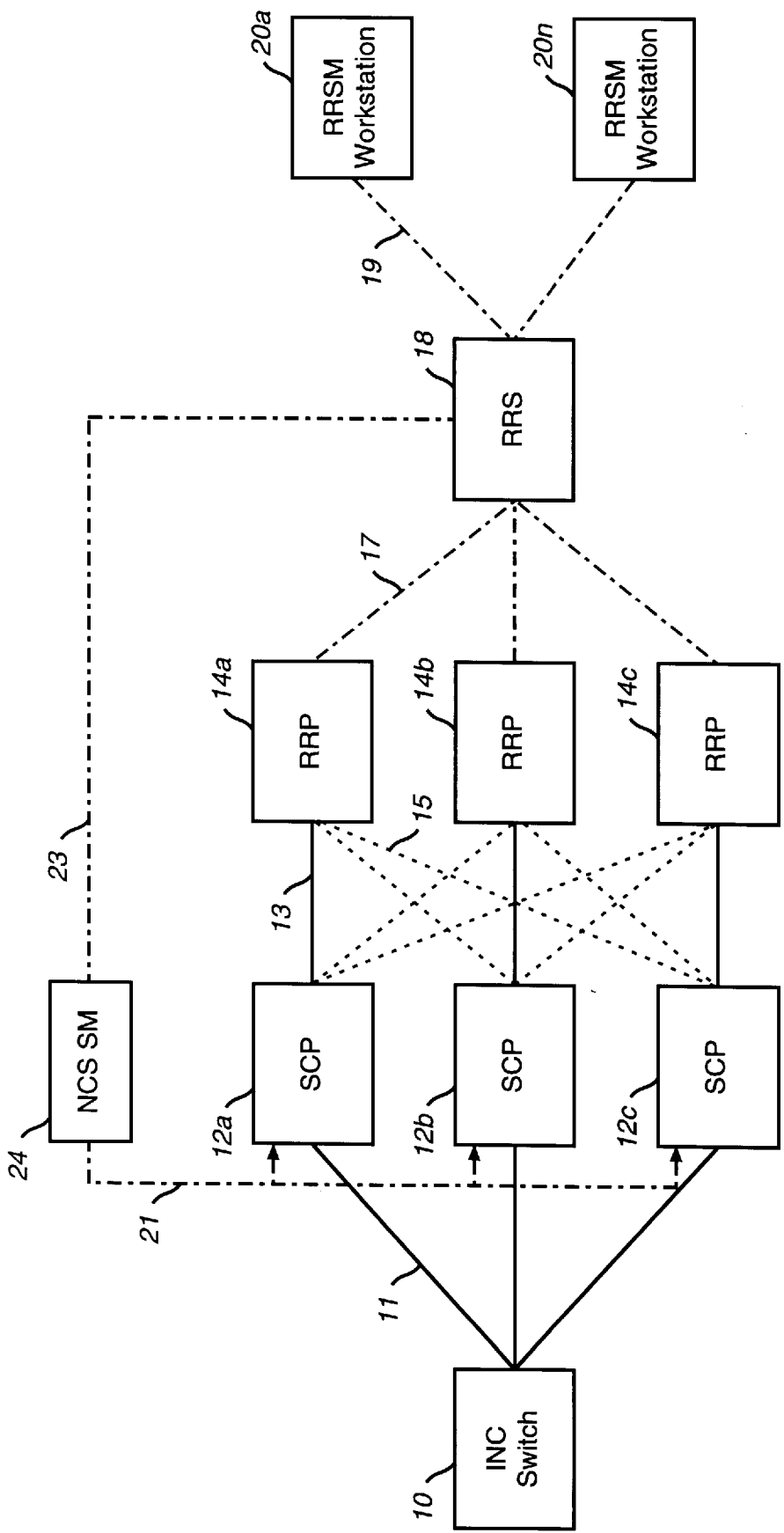
FIG. 1 is a block diagram of the architecture of a system according to the present invention.

Referring now to the drawings, and first to FIG. 1, a block diagram illustrates the network architecture of the preferred embodiment of the system of the present invention. An international carrier (INC) switch 10 is coupled to a network control system service control point (NCS SCP) 12. For implementation in an actual network, each INC switch 10 is connected to three redundant SCPs 12a . . . 12c via standard data communications links 11; this provides survivability in the event of a network failure.

Each SCP 12a is connected to one primary regulatory routing platform (RRP) 14a via a standard LAN connection (e.g., a token ring LAN implemented on a fiber optic distributed data interface (FDDI) ring). Each SCP 12a is also connected to two secondary RRPs 14b . . . 14c for redundancy via standard T1 telecommunication lines 15. In alternative embodiments, an NCS SCP 12a and an RRP 14a may reside on the same hardware components and communicate with each other via shared memory.

SCPs 12 provide call processing for domestic and international traffic. When switch 10 receives a call, it issues a query to a SCP 12 for a routing translation. SCP 12 executes a series of processes to determine how to route the call. If, during call processing, SCP 12 determines the call to be an international call (a call between any two countries), a trigger mechanism occurs and the SCP 12 issues a Generic Request Message to an RRP 14. RRP 14 receives the Generic Request Message, executes a series of processes to determine how to route the call, and returns a routing translation to SCP 12 in the form of a Generic Response Message. SCP 12 then passes the routing translation back to switch 10, which proceeds to route the call.

Service management systems exist to manage and maintain the databases within SCPs 12 and RRPs 14. An NCS SCP system 12 accepts input data from users for the NCS platform. This data is passed on to an NCS service manager 24, which translates the data into a format for SCPs 12, and performs data distribution among SCPs 12. This distribution is via dedicated data communications links 21.

User input for RRPs 14 is performed on regulatory routing service management (RRSM) workstations 20*a* . . . 20*n*. Input data is passed on to a regulatory routing server (RRS) 18 via LAN connections 19. RRS 18 performs data translation and distribution among RRPs 14 via LAN connections 17. RRS 18 also has a data link 23 to the NCS SM 24 for the purpose of receiving network configuration data input from the user via NCS SCP 12.

Figure 2:
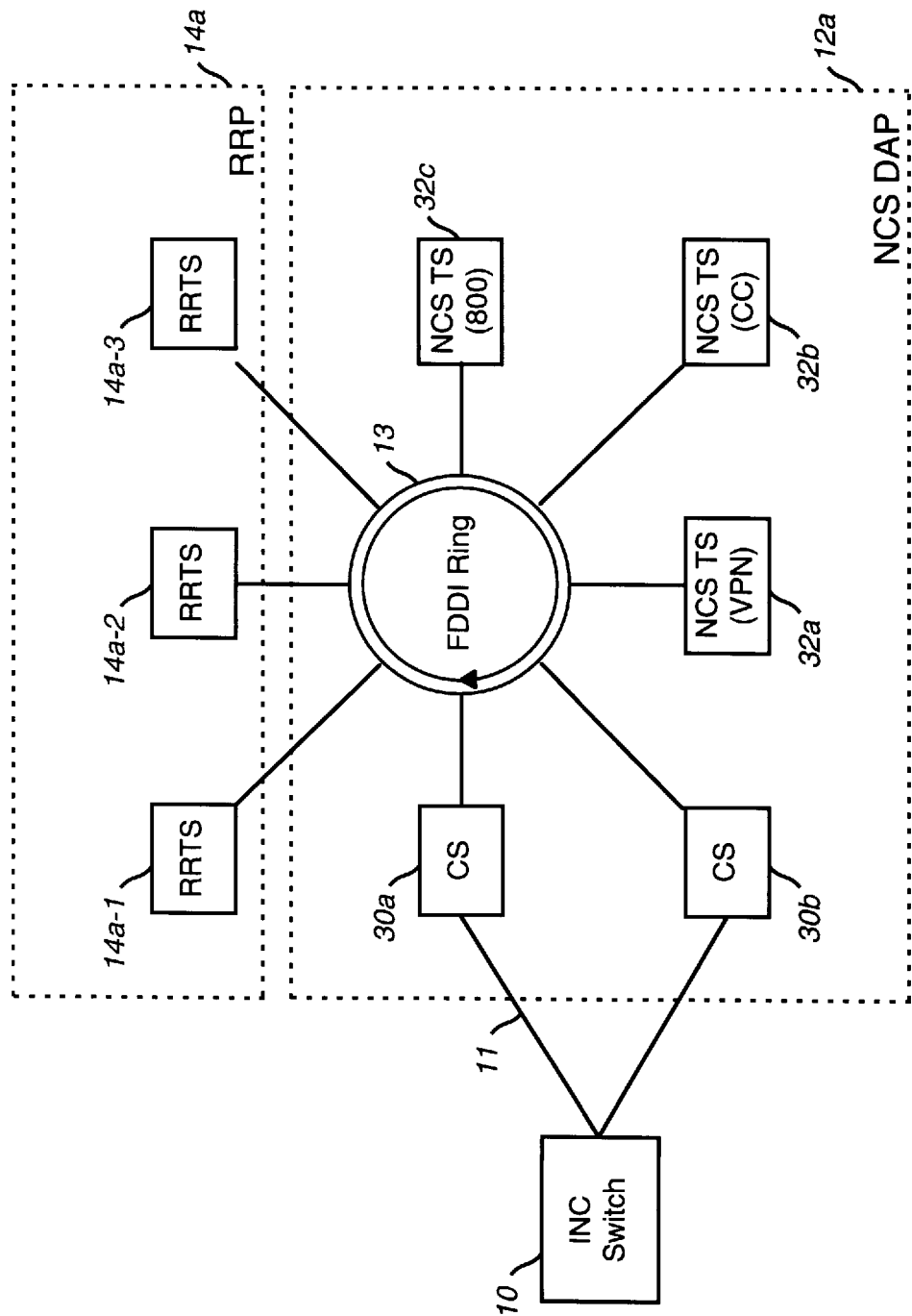
FIG. 2 is a block diagram of the architecture of service control point and regulatory routing platform cluster according to the present invention.

Referring now to FIG. 2, a block diagram illustrates the detailed architecture of a single NCS SCP/RRP cluster (12*a*/14*a*), including several communications and transaction servers. A single SCP 12*a* generally includes up to 25 communication servers (CS) 30*a* . . . 30*b*, and a plurality of NCS transaction servers (TS) 32*a* . . . 32*c*. A Fiber distributed Data Interface (FDDI) ring 13 provides a LAN environment for the various servers to operate in.

RRP 14*a* includes multiple regulatory routing transaction servers (RRTS) 14*a*-1 . . . 14*a*-3. The architecture is scaleable and additional RRTSs may be added to support increased call volumes. RRTSs 14*a*-1 . . . 14*a*-3 are linked to the NCS transaction servers 32 via FDDI ring 13.

Switch 10 is connected to SCP 12*a* redundantly, via a single X.25 data link 11 to each CS 30*a* . . . 30*b*. This provides survivability in the event of either a link 11 failure or CS 30 failure. When switch 10 issues a query for call processing to the SCP 12*a*, a CS 30 identifies the call type. The CS 30 then determines which NCS TS 32 to route the query to, based on the determined call type. Call types may be 800, Virtual Private Network (VPN), Calling Card (CC), and others.

During NCS TS 32 processing of the query, it may be determined that the query is for an international call that is subject to regulatory routing requirements. This determination is based on a trigger point in the call processing flow. NCS TS 32 creates a Generic Request Message. The Generic Request Message, which contains data from the original switch query message along with the data obtained from NCS TS processing, is sent to an RRTS 14. The Generic Request message may also include the call service type.

Alternatively, CS 30 may determine from the call type that the query should be routed directly to an RRTS 14. In this case, CS 30 creates a Generic Request Message for the query and sends it to the appropriate RRTS 14.

RRTS 14 processes the query and returns a network address for routing to either NCS TS 32 or CS 30, depending on which component first sent the Generic Request Message to RRTS 14. CS 30 then includes this network address in the response message that it sends back to switch 10. The network address may be an International Direct Dialed Digits (IDDD) or E.164 number or a switch/trunk identifier for a Direct Termination Call (DTC). CCITT recommendation E.164, "Numbering Plan for the ISDN Era", addresses telephone Network and ISDN Operation, Numbering, Routing, and Mobile Services. E.164 has become the international standard for international addressing, and it is used to mean the "International ISDN Numbering Plan."

Figure 3:
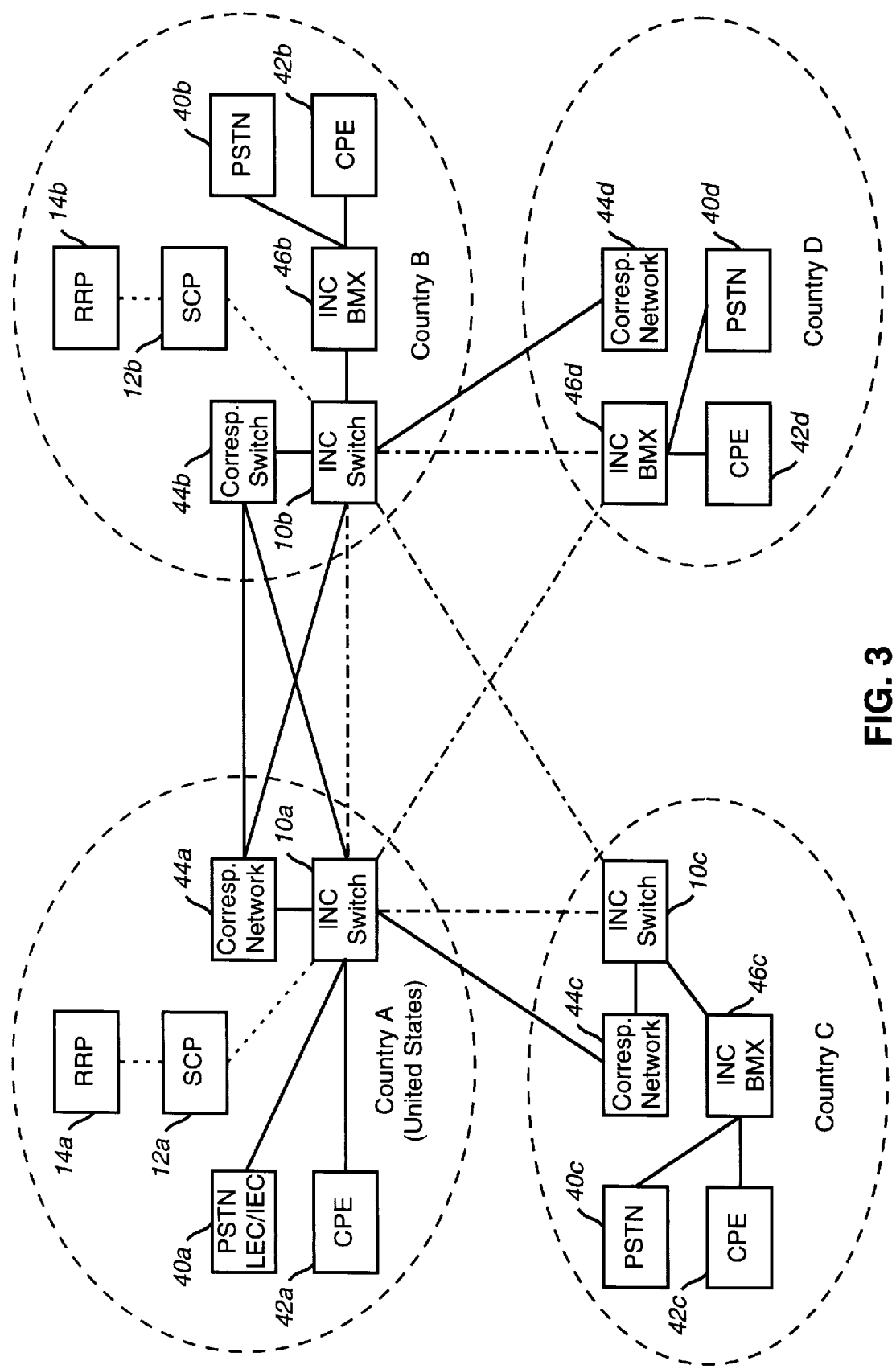
FIG. 3 is a block diagram illustrating an example of an international telecommunications network.

Referring now to FIG. 3, there is illustrated a block diagram of an exemplary international telecommunications network. The various determining factors and routing requirements imposed by the present invention will be described with reference to FIG. 3. While many different international and domestic carriers may play a role in completing a call, the present invention is designed to optimize call routing for the International Carrier (INC) that employs it. Therefore, the term INC will refer to the specific carrier for which the present invention is being used. Although a typical INC network will span many countries, four are shown for illustrative purpose.

Country A represents a country in which the INC has network facilities for accepting call originations and performing call terminations. Country A could represent the United States. The INC has a switch 10*a* for transporting calls into and out of Country A. INC switch 10*a* may actually be a single switch, or a network of switches; however, a single switch is shown in FIG. 3 for illustrative purpose. In some countries, such as the U.S., an INC may be allowed to provide interexchange carrier (IEC) services, in which case a network of switches will be employed by the INC.

INC switch 10*a* has access to the public switched telephone network (PSTN) 40*a*. In the United States, the PSTN 40*a* is provided by local exchange carriers (LEC) and interexchange carriers (IEC). Access to PSTN 40*a* allows INC switch 10*a* to provide shared access (for call originations) and egress (for call terminations) network services. This is also known as switched access/egress.

INC switch 10*a* also has access to customer premises equipment (CPE) 42*a*. CPE access is typically via a dedicated access line (DAL), and allows INC switch 10*a* to provide dedicated access/egress to customers.

INC switch 10*a* has a data link to NCS SCP 12*a* and RRP 14*a*. RRP 14 performs the call processing needed to provide INC switch 10*a* with call routing translations.

INC switch 10*a* is also linked to one or more correspondent network switches 44*a*. A correspondent network switch 44*a* provides international call routing on another carrier's network. Correspondent network switch 44*a* generally has access to PSTN 40*a* and CPE 42*a* as well, and may be used, as dictated by regulatory routing requirements, to terminate calls to PSTN 40*a* or CPE 42*a* in Country A.

Country B represents another country in which the INC has network facilities for accepting call originations and performing call terminations. An INC switch 10*b* is similarly connected to a SCP 12*b* and a RRP 14*b*. Preferably, there will be SCP/RRP pair located in each country in which an INC switch is located. However, this is not necessary. The SCP/RRP pair may be singular and located in one country, with INC switches in other countries accessing it remotely. Or there may be a SCP/RRP pair in some countries, accessed locally by the INC switch in each of those countries, and accessed remotely by INC switches in other countries. As shown in FIG. 1, there may be multiple, redundant SCP/RRP pairs in a single country.

INC switch 10*b* has access to a PSTN 40*b* and a CPE 42*b* of customers in Country B. Generally, this access will be via a network concentrator device, such as a BMX 46*b*, which is manufactured by Ericsson Corporation of Sweden, or a private branch exchange (PBX), that is physically located near a high concentration of customers accessed by a PSTN 40*b* or CPE 42*b*. BMX 46*b* concentrates multiple trunks from various PSTNs 40*b* and CPEs 42*b* and provides a single physical transport line to INC switch 10*b*. There will generally be multiple BMXs 46*b* in use as part of the INC network. As in Country A, INC switch 10*b* in Country B is linked to one or more correspondent network switches 44*b*.

Country C represents a country in which the INC has facilities for call terminations and originations, via an INC switch 10c. However, INC switch 10c does not have a link to a SCP/RRP pair. Again, the INC switch 10c uses an INC BMX 46c for access to a PSTN 40c and a CPE 42c. The INC will also make use of correspondent network switches 44c, as regulatory routing requires.

Country D represents a country in which the INC has facilities for call terminations and originations, but not an INC switch. The INC has a BMX 46d, which is remotely accessed by INC switches in other countries, such as INC switch 10a in Country A and INC switch 10b in Country B.

Regulatory routing requirements, as dictated by ISR agreements, specify how the INC may transport calls from one country to another, based on certain factors. These factors presently include:

originating country (country from which call originated, or from which it is being forwarded or transferred, identified by country code);

destination country (identified by country code);

type of access to the INC network (switched or dedicated);

type of egress at destination (switched or dedicated);

point-of-entry of call into the INC network (defined by the INC switch that performs the RRP database query);

originating carrier (PSTN that originated the call);

terminating carrier;

revenue owner for the call (carrier who sold or maintains account, who may not actually carry the call); and, call service type.

Point-of-entry and originating country may not always be the same. A call may originate in Country D, but be delivered by INC BMX 46d to INC switch 10a in Country A. Since INC switch 10a will perform the RRP query, Country A is defined as the point-of-entry.

Based on these factors for each call, regulatory routing requirements may dictate that the INC:

must hand the call off to another carrier (correspondent network) for transport across international boundaries;

must hand the call off to a PSTN in the country of INC point-of-entry;

may transport the call across international boundaries, but must hand the call off to another carrier for termination in the destination country;

may transport the call to the destination country for handoff to another carrier;

or may transport the call all the way to the destination trunk group in the destination country.

To optimize call routing for the INC in terms of network efficiency, the present invention evaluates each of the call factors, determines the call routes in compliance with regulatory routing requirements, identifies the compliant call route that makes the most efficient use of the INC network, and provides one of the following call routing results:

far-end hop off (FEHO), in which the INC transports call to the destination country, for delivery to a PSTN;

far-end hop off (FEHO), in which the INC transports call to the destination country, for delivery to a correspondent network;

near-end hop off (NEHO), in which the INC transports call to a correspondent network in the originating country and the correspondent network routes call internationally;

near-end hop off (NEHO), in which the INC transports call to a local PSTN, in the originating country, for international routing;

mid-point hop off (MPHO), in which the INC transports call part of the way (internationally) to the destination country;

direct termination, in which the INC transports the call all the way to the customer site in the destination country. Additionally, some regulatory scenarios simply prohibit certain calls from completing. Call blocking is another possible outcome.

The INC may receive a call in Country A from a Virtual Private Network (VPN) customer. INC switch 10a will receive the call from CPE 42a. Since it is a VPN call, initial routing intentions will be to route the call on-net all the way to its destination, which is CPE 42b in Country B. However, due to a specific ISR agreement, regulatory routing requirements may dictate that a correspondent network must transport the call across international boundaries. Therefore, when INC switch 10a receives the call, it performs a query to SCP 12a. SCP 12a transfers the query to RRP 14a, since it is an international call. RRP 12a responds with instructions to route the call to Correspondent Switch 44a, thus, forcing the call off-net, and constituting a NEHO, in accordance with regulatory routing requirements. The ability to specify call processing instructions, based on call service type, that are in accordance with regulatory routing requirements and that are different from the standard call processing instructions for the same call service type, is a unique advantage provided by the present invention.

Likewise, if regulatory routing requirements allow the INC to transport the call to the destination country (Country B), then RRP 12a responds with instructions to route the call to CPE 42b via INC switch 10b, constituting a FEHO. This route uses the INC network as much as possible, minimizing the cost of routing the call for the INC.

The present invention also allows for overflow call routing. For example, a call originates in Country A on PSTN 40a and is destined for PSTN 40b in Country B. According to regulatory routing requirements, INC switch 10a routes the call as a FEHO to INC switch 10b for terminating to PSTN 40b. However, the call encounters an all circuits-busy condition at PSTN 40b. The call is released back to INC switch 10a, which performs another RRP query to determine overflow routing. RRP 10a may respond with instructions to route the call to Correspondent Switch 44b (which also has access to PSTN 40b) via INC switch 10b. Tertiary, the call may be routed to correspondent network switch 44a via INC switch 10a. Overflow route priority is in order of INC cost efficiency, in compliance with regulatory routing requirements.

FIGS. 4a–4f illustrate various call flows using FEHO, NEHO, and MPHO routing schemes. These call flows are exemplary, and are not inclusive of all possible call flows.

Figure 4A:
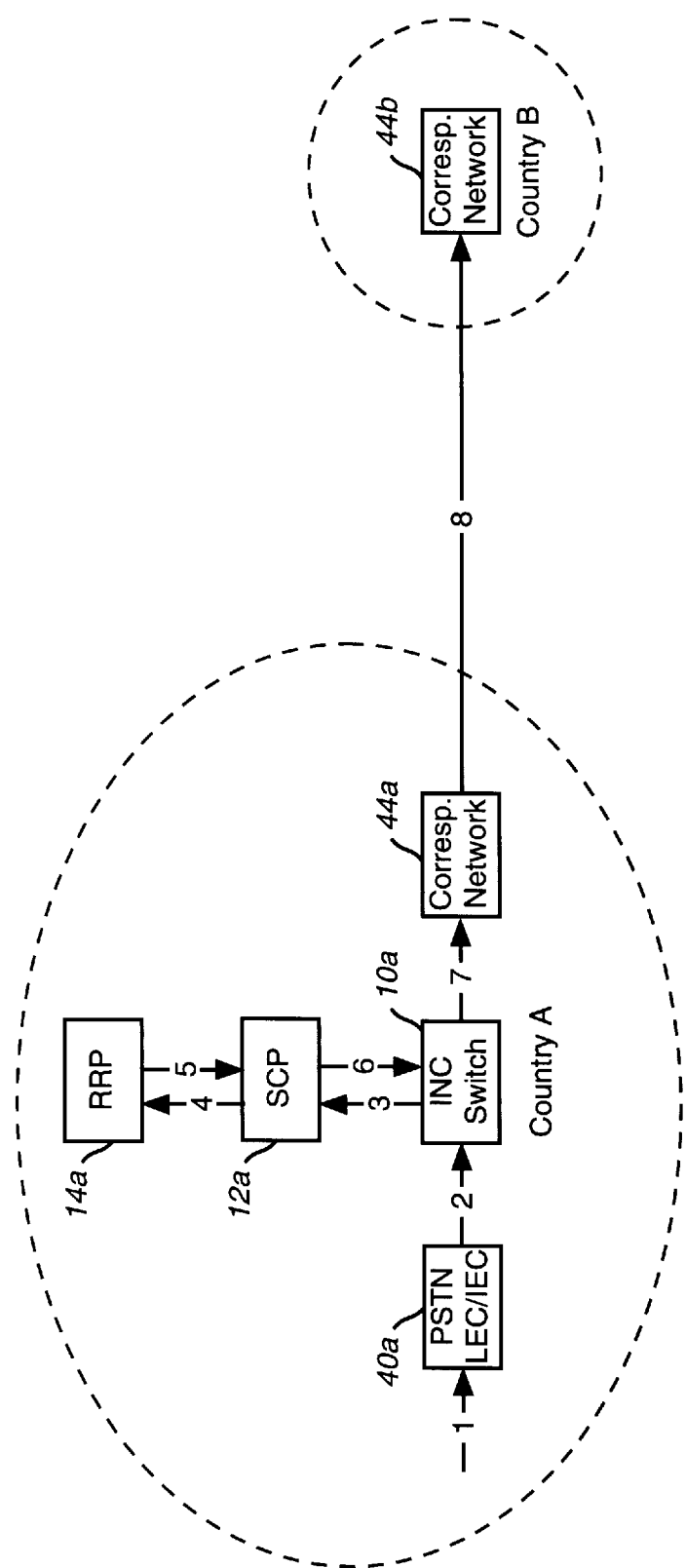
FIGS. 4a–4f illustrate examples of the flow of calls and data according to the present invention.

FIG. 4a shows the call flow of a NEHO from Country A to a switched or dedicated termination via a Correspondent Network.

1. Using one of several switched access methods (calling card, dial-1, remote access), a customer in Country A dials an E.164 number, or a VPN number that translates to a dedicated termination (DAL) or an E.164 number. Since call uses switched access, it originates on a PSTN network 40a.

2. The PSTN 40a (which will be a LEC and possibly an IEC in the U.S.) delivers the call to an INC switch 10a.

3. The originating INC switch 10a issues a query to the SCP 12a.

4. The SCP 12a issues a query to the RRP 14a, with the intended termination and an alternate E.164 address for dedicated terminations.

5. The RRP 14*a* determines that NEHO is required, and returns a routing translation to the SCP 12*a*. The routing translation will include outpulse digits (i.e., E.164 number) that indicate the call destination and an Action Code. The Action Code indicates how the switch should treat the call (i.e., which routing table to use, whether overflow routing is available). In this example, the combination of outpulse digits and Action Code tell the switch to route the call to a Correspondent Network 44*a*, outpulse the appropriate E.164 digits, and complete the billing record accordingly. The Action Code may also go on the billing record to instruct downstream systems on how to process the billing record.

6. The SCP 12*a* returns the routing information to the originating INC switch 10*a* in a response message.

7. The INC switch 10*a* routes the call to a Correspondent Network 44*a*.

8. The Correspondent Network 44*a* completes the call as an international call. A Correspondent Network 44*b* in the destination country (Country B) will terminate the call.

Figure 4B:
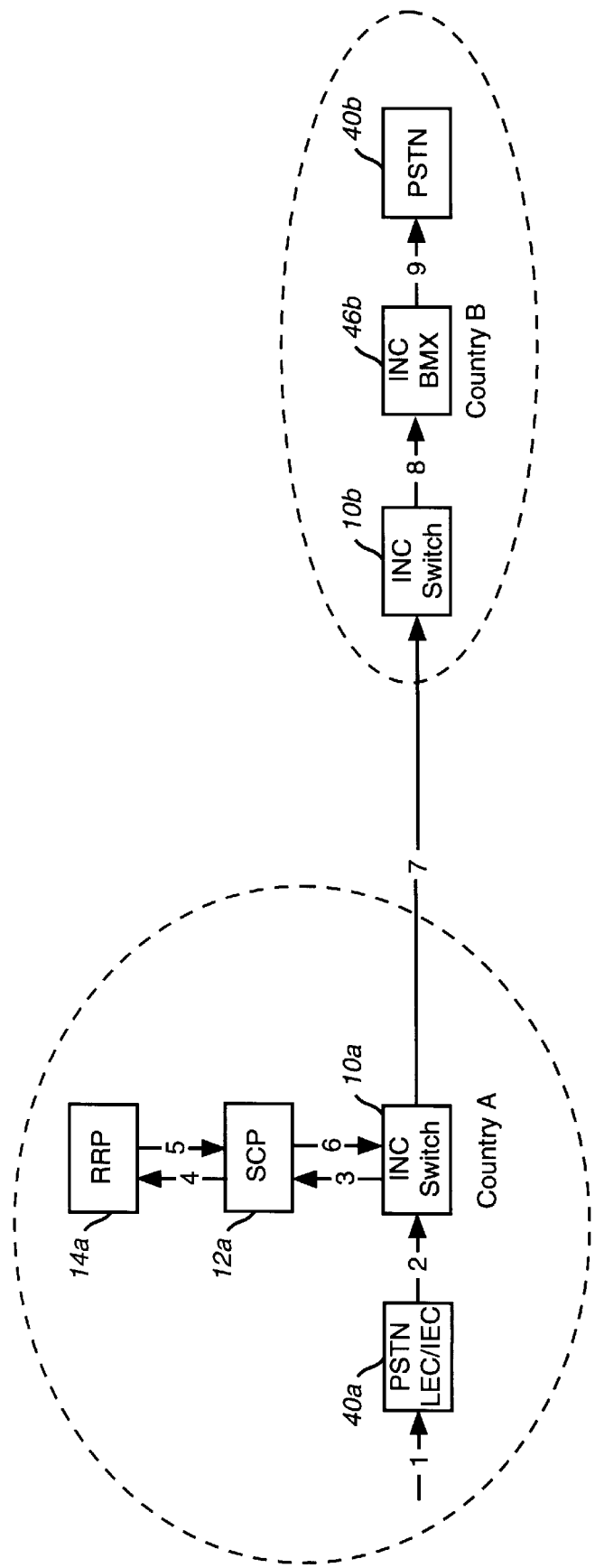

FIG. 4*b* shows the call flow of a FEHO from Country A to a switched termination. Processes to accommodate a dedicated termination are noted in description below:

1. Using one of several switched access methods (calling card, dial-1, remote access, registered access), a customer in Country A dials an E.164 number, a national number, or a VPN number that translates to a dedicated termination (DAL), an E.164 number, or a national number. Since call uses switched access, it originates on a PSTN network 40*a*.

2. The PSTN 40*a* (which will be a LEC and possibly an IEC in the U.S.) delivers the call to an INC switch 10*a*.

3. The originating INC switch 10*a* issues a query to the SCP 12*a*.

4. The SCP 12*a* issues a query to the RRP 14*a*, with the intended termination and an alternate E.164 address for dedicated terminations.

5. The RRP 14*a* determines that FEHO is allowed, and returns a routing translation to the SCP 12*a*. The routing translation includes outpulse digits (i.e., E.164 number) that indicate the call destination, an Action Code, and a terminating switch/trunk identifier for the INC network. In this example, the routing translation will tell the INC switch 10*a* to route the call via the INC private network to its destination PSTN 40*b* in Country B. If the intended termination is a dedicated termination, the RRP 14*a* will instruct the SCP 12*a* to use the intended termination as the default routing address.

6. The SCP 12*a* returns the routing information to the originating INC switch 10*a* in a response message.

7. The INC switch 10*a* routes the call to an INC switch 10*b* in the destination country. This may actually involve many INC switches; two are shown for illustrative purpose. Switch 10*a* includes the terminating switch/trunk identifier, for the INC switch 10*b* trunk that serves INC BMX 46*b*, as input to each switch's routing tables.

8. INC switch 10*b* delivers call to INC BMX 46*b*.

9. INC BMX 46*b* delivers call to PSTN 40*b* (if switched termination), outpulsing the E.164 number. The PSTN 40*b* completes the call as a national, or domestic, call. For dedicated terminations, INC BMX 46*b* delivers call to CPE 42*b*.

Figure 4C:
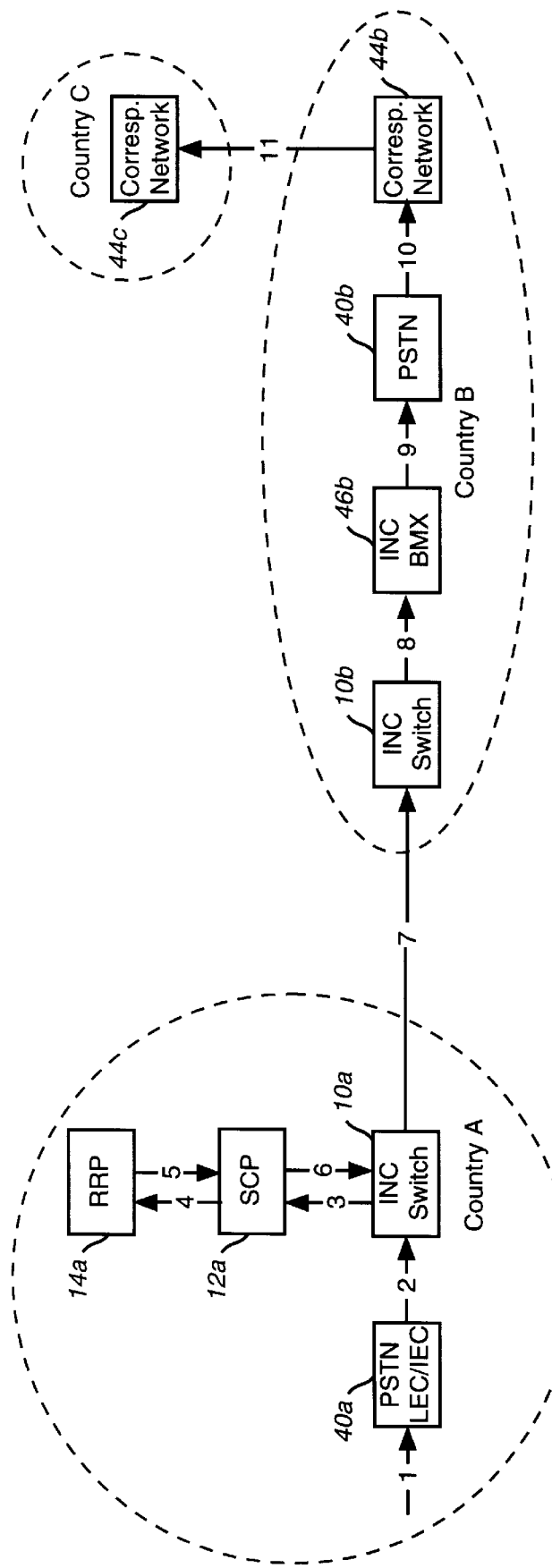

FIG. 4*c* shows the call flow of a MPHO from Country A to a switched termination, using a Correspondent Network. Processes to accommodate a dedicated termination are noted in description below:

1. Using one of several switched access methods (calling card, dial-1, remote access, registered access), a customer in Country A dials an E.164 number, or a VPN number that translates to a dedicated termination (DAL) or an E.164 number. Since call uses switched access, it originates on a PSTN network 40*a*.

2. The PSTN 40*a* (which will be a LEC and possibly an IEC in the U.S.) delivers the call to an INC switch 10*a*.

3. The originating INC switch 10*a* issues a query to the SCP 12*a*.

4. The SCP 12*a* issues a query to the RRP 14*a*, with the intended termination and an alternate E.164 address for dedicated terminations.

5. The RRP 14*a* determines that MPHO is required, and returns a routing translation to the SCP 12*a*. The routing translation includes outpulse digits (i.e., E.164 number) that indicate the call destination, an Action Code, and a terminating switch/trunk identifier for the INC network. In this example, the routing translation will tell the INC switch 10*a* to route the call via the INC private network to a INC/Correspondent network hand-off point in a country near the destination country. The choice of handoff point will be dependent on INC and Correspondent network facilities, and will be a strategic decision to minimize the cost of call routing for the INC.

6. The SCP 12*a* returns the routing information to the originating INC switch 10*a* in a response message.

7. The INC switch 10*a* routes the call to an INC switch 10*b* in the country of the handoff. This may actually involve many INC switches; two are shown for illustrative purpose. Switch 10*a* includes the terminating switch/trunk identifier, for the INC switch 10*b* trunk that serves INC BMX 46*b*, as input to each switch's routing tables.

8. INC switch 10*b* delivers call to INC BMX 46*b*.

9. INC BMX 46*b* delivers call to PSTN 40*b*, outpulsing the E.164 number.

10. The PSTN 40*b* completes the call as an international call, using a Correspondent Network 44*b*. Routing is via the E.164 number.

11. The Correspondent Network 44*b* completes the call using a Correspondent Network 44*c* in the destination country, Country C.

Figure 4D:
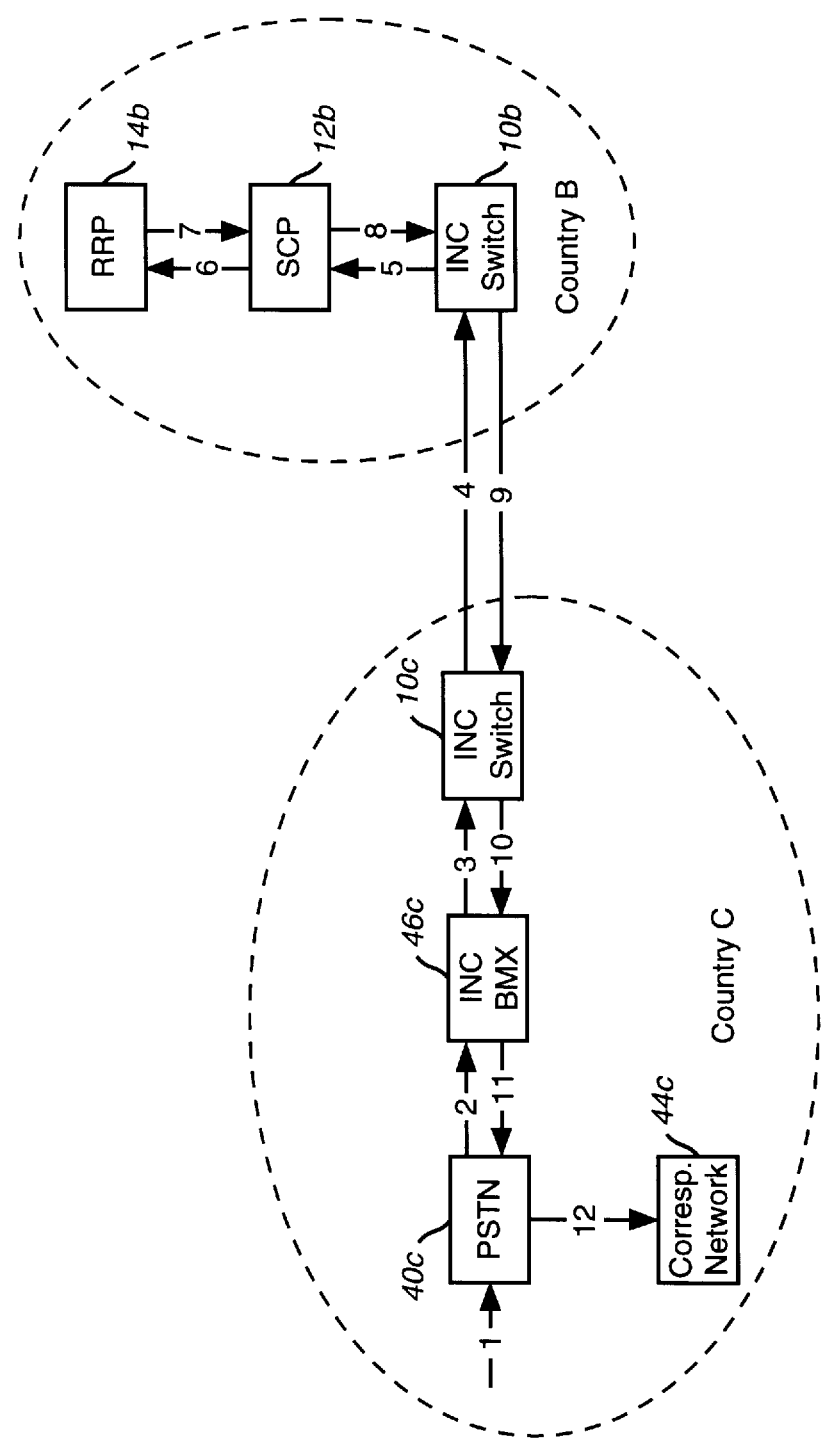

FIG. 4*d* shows the call flow of a NEHO to a switched termination for a call originating in Country C. The INC has a switch in Country C, but the switch does not have access to an RRP.

1. Using one of several switched access methods (calling card, dial-1, remote access), a customer in Country C dials an E.164 number, or a VPN number that translates to a dedicated termination (DAL) or an E.164 number. Since call uses switched access, it originates on a PSTN network 40*c*.

2. PSTN 40*c* delivers call to INC BMX 46*c*.

3. INC BMX 46*c* delivers call to INC switch 10*c*.

4. INC switch 10*c*, using switch routing tables, routes the call to INC switch 10*b* in Country B.

5. INC switch 10*b* issues a query to the SCP 12*b*.

6. The SCP 12*b* issues a query to the RRP 14*b*, with the intended termination and an alternate E.164 address for dedicated terminations.

7. The RRP 14b determines that NEHO is required, and returns a routing translation to the SCP 12b. The routing translation will consist of outpulse digits (i.e., E.164 number) that indicate the call destination, an Action Code, and a terminating switch/trunk identifier for the INC network. In this example, the routing translation will tell the INC switch 10b to route the call via a Correspondent Network in the originating country.

8. The SCP 12b returns the routing information to the INC switch 10b in a response message.

9. INC switch 10b routes the call back to INC switch 10c.

10. INC switch 10c delivers call to INC BMX 46c.

11. INC BMX 46c delivers call to PSTN 40c, outpulsing the E.164 number.

12. PSTN 40c routes call to Correspondent Network 44c, which completes the call as an international call to it destination in another country.

Figure 4E:
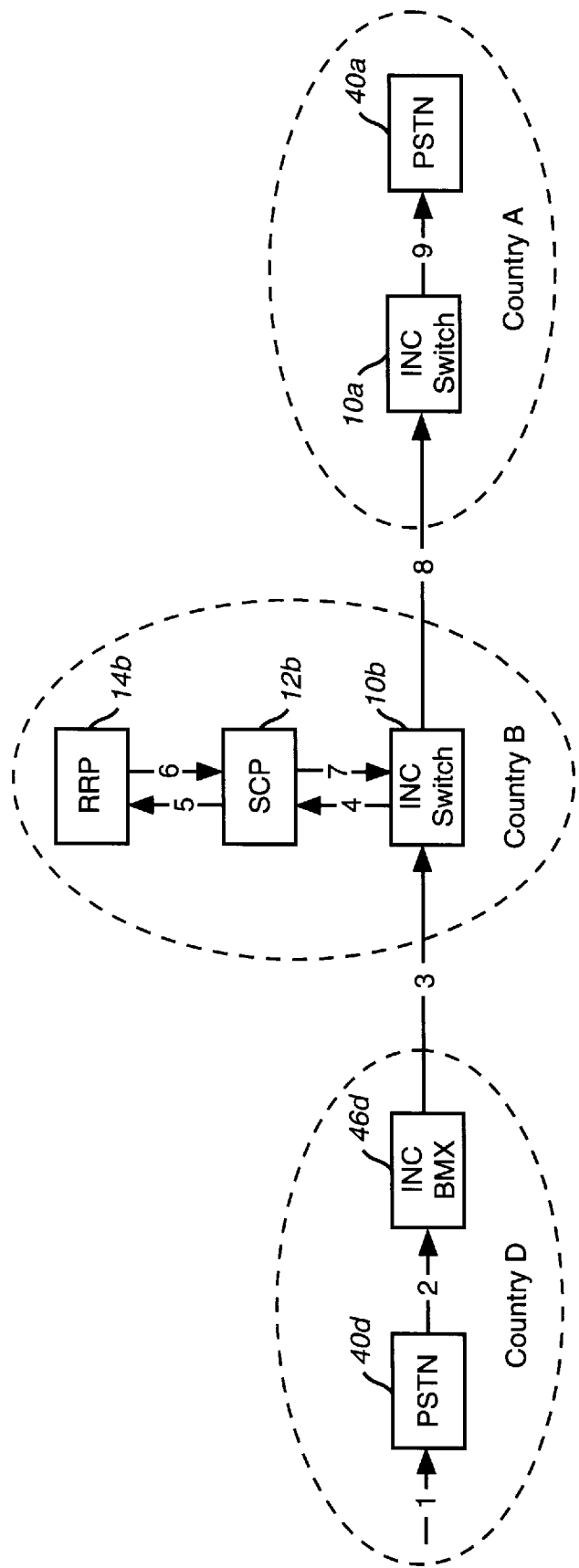

FIG. 4e shows the call flow of a FEHO to a switched termination for a call originating in Country D. The INC has a BMX in Country D, but does not have a switch. The INC BMX 46d accesses INC switch 10a in Country A and INC switch 10b in Country B.

1. Using one of several switched access methods (calling card, dial-1, remote access), a customer in Country C dials an E.164 number, or a VPN number that translates to a dedicated termination (DAL) or an E.164 number. Since call uses switched access, it originates on a PSTN network 40d.

2. PSTN 40d delivers call to INC BMX 46d.

3. INC BMX 46d delivers call to INC switch 10b in Country B.

4. INC switch 10b issues a query to the SCP 12b.

5. The SCP 12b issues a query to the RRP 14b, with the intended termination and an alternate E.164 address for dedicated terminations.

6. The RRP 14b determines that FEHO is allowed, and returns a routing translation to the SCP 12b. The routing translation includes outpulse digits (i.e., E.164 number) that indicate the call destination, an Action Code, and a terminating switch/trunk identifier for the INC network. In this example, the routing translation will tell the INC switch 10b to route the call via the INC private network to its destination PSTN 40a in Country A. If the intended termination is a dedicated termination, the RRP 14b will instruct the SCP 12b to use the intended termination as the default routing address.

7. The SCP 12b returns the routing information to the originating INC switch 10b in a response message.

8. The INC switch 10b routes the call to an INC switch 10a in the destination country. This may actually involve many INC switches; two are shown for illustrative purpose. Switch 10b includes the terminating switch/trunk identifier, for the INC switch 10a trunk that serves PSTN 40a, as input to each switch's routing tables.

9. INC switch 10b delivers call to PSTN 40a, which, if in the U.S., may be a LEC or IEC.

Figure 4F:
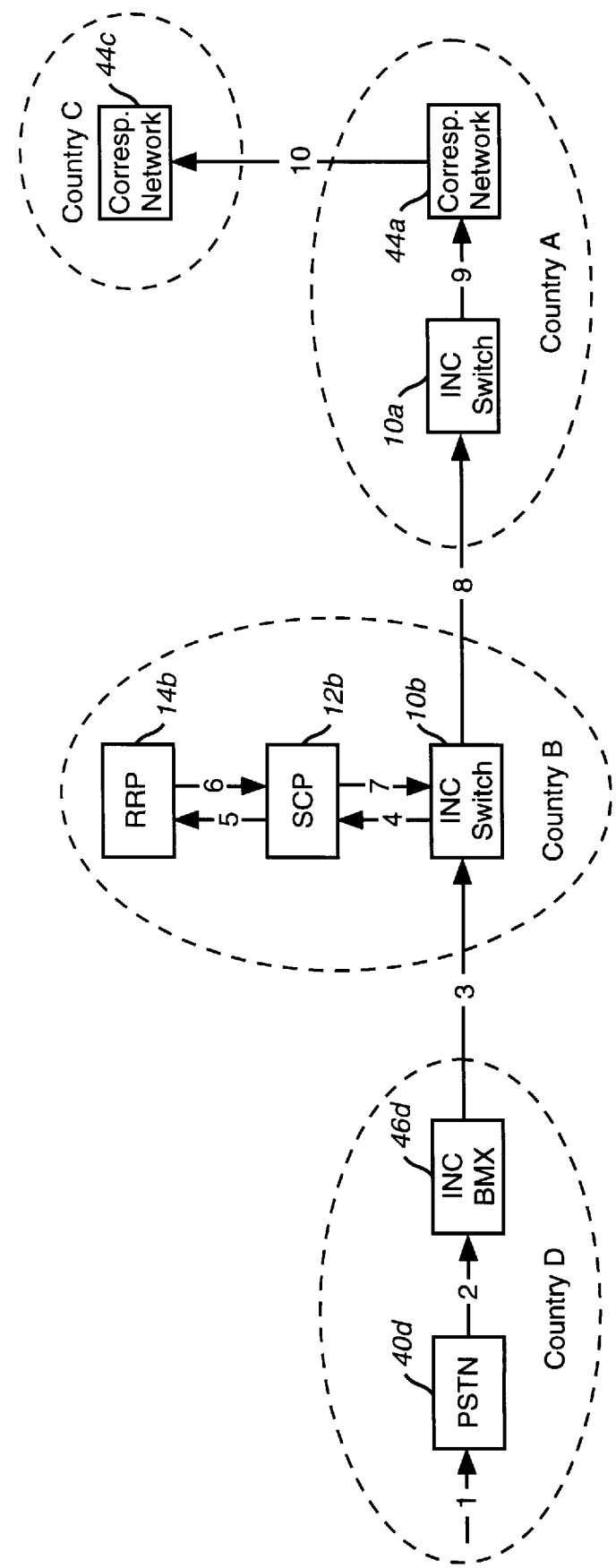

FIG. 4f shows the call flow of a MPHO to a switched termination for a call originating in Country D.

1. Using one of several switched access methods (calling card, dial-1, remote access), a customer in Country C dials an E.164 number, or a VPN number that translates to a dedicated termination (DAL) or an E.164 number. Since call uses switched access, it originates on a PSTN network 40d.

2. PSTN 40d delivers call to INC BMX 46d.

3. INC BMX 46d delivers call to INC switch 10b in Country B.

4. INC switch 10b issues a query to the SCP 12b.

5. The SCP 12b issues a query to the RRP 14b, with the intended termination and an alternate E.164 address for dedicated terminations.

6. The RRP 14b determines that MPHO is required, and returns a routing translation to the SCP 12b. The routing translation includes outpulse digits (i.e., E.164 number) that indicate the call destination, an Action Code, and a terminating switch/trunk identifier for the INC network. In this example, the routing translation will tell the INC switch 10b to route the call via the INC private network to a INC/Correspondent network handoff point in a country near the destination country. The choice of handoff point will be dependent on INC and Correspondent network facilities, and will be a strategic decision to minimize the cost of call routing for the INC 7. The SCP 12b returns the routing information to the originating INC switch 10b in a response message.

8. The INC switch 10b routes the call to an INC switch 10a in the handoff country. This may actually involve many INC switches; two are shown for illustrative purpose. Switch 10b includes the terminating switch/trunk identifier, for the INC switch 10a trunk that serves Correspondent Network 44a, as input to each switch's routing tables.

9. INC switch 10a routes the call to the Correspondent Network 44a, outpulsing the E.164 number.

10. Correspondent Network 44a completes the call using a Correspondent Network 44c in the destination country, Country C.

FIG. 5 illustrates an example of a regulatory routing requirements matrix for an INC. Since the invention must determine the optimal route that complies with regulatory routing requirements, these requirements must be presented in a manner that is easily accessible and configurable. This is done by presenting requirements as an M×N matrix for each INC, where M represents destination countries and N represents origination countries. Additionally, each M×N cell is broken down into an m×n matrix, where m represents access type and n represents egress type. Call service type may also be included as entries in matrix cells. There may also be tables used for time-of-day or day-of-week routing.

FIG. 5 is a matrix for a particular INC that has five origination countries and five terminating countries. As an example of a call route that is dictated by regulatory routing requirements, suppose a call originates via dedicated access in Germany and is destined to a dedicated termination in the United States. The matrix shows that this call will be routed L-N-L; that is, it will originate on a local loop or private line, will be transported on the INC's private network, and will terminate on a local loop or private line (it is common for dedicated access lines to be implemented on local loops).

Suppose a call originates in Germany via switched access and is destined for Japan to a switched termination. The call will originate via PSTN in Germany, and must be transported via Correspondent Network; this represents a NEHO.

Figure 6A:
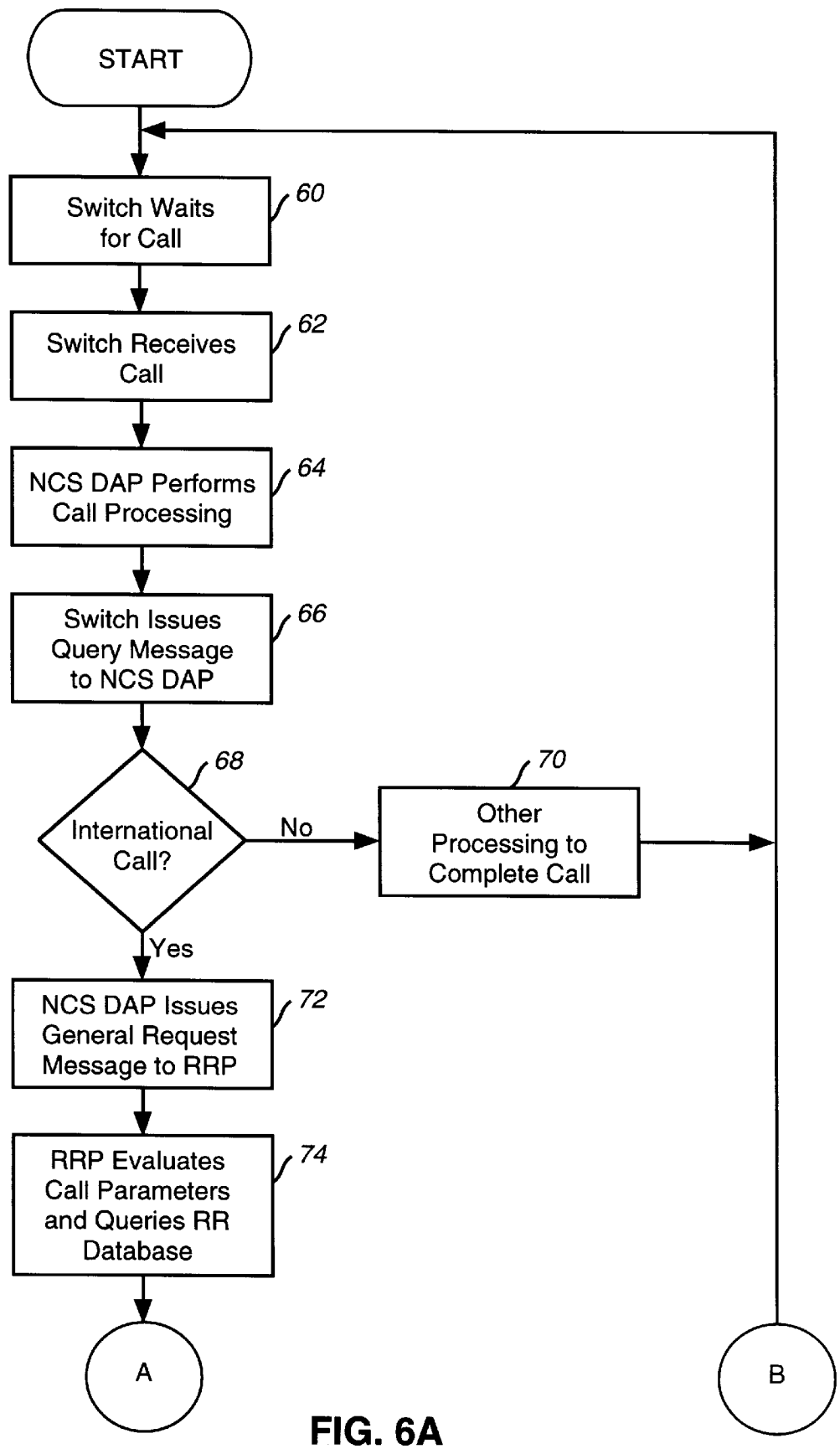
FIGS. 6A and 6B comprise a flowchart of a preferred implementation of the present invention.
Figure 6B:
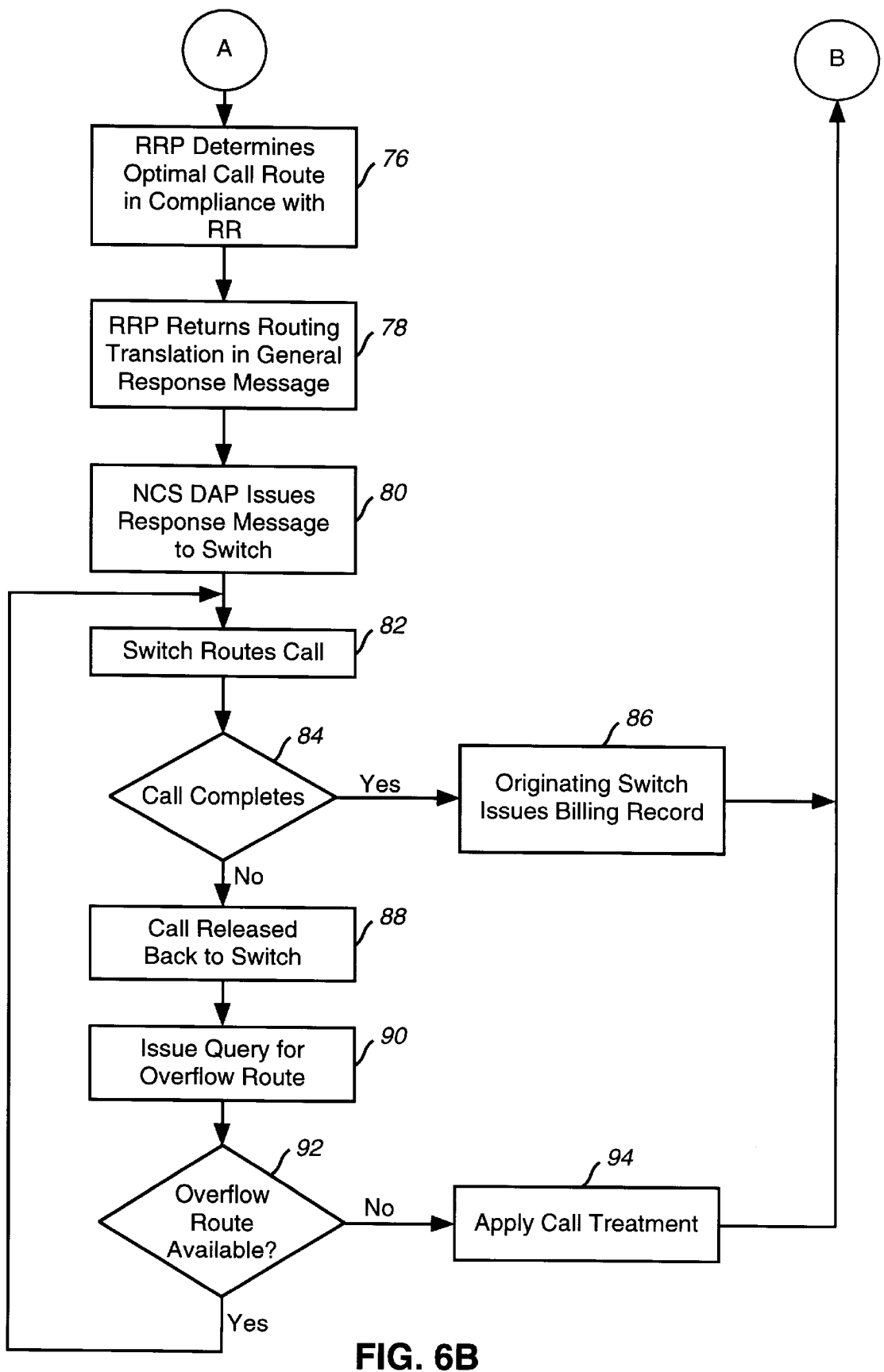

Referring now to FIGS. 6A and 6B, a high level process flowchart of the preferred operation of the invention is illustrated. In the preferred embodiment, the present invention is implemented in a distributed environment with separate platforms performing various processes and passing messages back and forth. However, for purposes of illustration, FIGS. 6A and 6B depict an integrated process.

An INC switch waits for a call at block 60. when an INC switch receives a call, at block 62, it issues a query message to an NCS SCP, at block 64. This query is for a routing translation that the INC switch may use to route the call properly. The query message contains standard call data such as dialed number, ANI or CLI, and date/time of call origination.

At block 66, the NCS SCP performs general initial call processing. This call processing determines from data in the switch query message the customer and service type of the call. Depending on the service type, the customer may be the calling party, the called party, or a product owner of the call. This is in accordance with conventional NCS call processing.

At decision block 68, the NCS SCP tests whether the call is an international call subject to regulatory routing requirements, based on various criteria, in accordance with the services and customers of the INC. For example, one set of criteria for a particular INC receiving a call originating in World Zone 1 (WZ1); in which WZ1 is defined to include Canada, the U.S., and the Caribbean; could be:

1. product owner is the INC;
2. call is not a WZ1 to WZ1 call;
3. call is not a U.S. to U.S. call for WZ1 to WZ1 calls that terminate to a DAL. If 1 and (2 or 3), then trigger query to RRP.

If, at decision block 68, the NCS SCP determines that the call is not an international call subject to regulatory routing requirements, the system performs other call processing, as indicated generally at block 70, and returns to block 60, where the switch waits for another call. If the call is an international call subject to regulatory routing requirements, the NCS SCP issues a Generic Request Message to the RRP, at block 72. The Generic Request Message requests from the RRP a routing translation in compliance with regulatory routing requirements. An alternate E.164 termination is included with the intended termination for the event that the RRP is unable to determine a call route. In the preferred embodiment, the Generic Request Message contains the following:

Message Header
  message length
  call context address
  network call tag
  trigger point identifier
  message type
  version number
  corporate identifier (customer identifier)
  message content
  network info offset
  database key offset
Message component: Network Information
  parameter: switch information
    parameter length
    originating switch identifier
    originating truck group
    access type
  parameter: address digits
    parameter length
    number of address digits
    address descriptor
    address digits
  parameter: ANI
    parameter length
    number of ANI digits
    ANI Descriptor
    ANI
  parameter: Supp Code
    parameter length
    Supp Code length
    Supp Code
Message Component: Database Keys
  origination country code
  originating carrier identifier
  terminating country code
  revenue carrier
  intended termination
  alternate E.164 termination
  NCS Information At block 74, the RRP evaluates the call parameters supplied in the Generic Request Message to determine a call route. The RRP uses these parameters as database keys and queries its database to determine what the regulatory routing requirements are. These requirements, as presented in the matrix of FIG. 5, are contained within the RRP's database and are created and maintained via user workstations 20*a* . . . 20*n* and the RRS 18, as shown in FIG. 1.

Specifically, the RRP evaluates parameters:
  originating country code;
  originating carrier identifier;
  terminating carrier identifier;
  point of entry (country of INC switch that issues SCP/RRP query);
  access type;
  egress type;
  destination country;
  revenue owner; and
  call service type.

By using these data as keys in querying its database, the RRP determines the optimal route for the call, at block 76 (FIG. 6B). RRP determines the optimal route by identifying the route that uses the INC's network to the maximum extent allowed under the specific regulatory routing requirements. This call route will be some form of FEHO, MPHO, or NEHO.

If more than one route is available that meets these criteria, the RRP may be programmed to perform Least Cost Routing algorithms, such as time-of-day, day-of week, call percent allocation, or various others.

At block 78, the RRP returns to the NCS SCP a Generic Response Message that contains a routing translation. This translation will be in the form of a direct termination call code (DTC, which is a switch/trunk identifier plus outpulsing digits that represent an E.164 or a DAL termination code), an E.164 number, or a logical instruction for the switch to apply call treatment. Call treatment may be to block the call and play a recorded message to the caller. In the preferred embodiment, the Generic Response Message contains the following:

Message Header
  message length
  call context address
  network call tag trigger point identifier
message type
version number
corporate identifier (customer identifier)
message content
Termination type
use default (for no record found or timeout condition)
alternate routing address, including but not limited to:
logical program name
E.164
DTC At block 80, the NCS SCP passes the routing translation on to the INC switch in a response message. At block 82, the INC switch proceeds to route the call accordingly. This may involve routing the call to another INC switch, to a Correspondent Switch, to a PSTN, or other destination, some of which were shown in FIGS. 4a–4f.

After the INC switch has routed the call, the system tests, at decision block 84, whether the call completed to its INC termination (Correspondent Switch, PSTN, etc.). Failure to complete may be due to an all-circuits-busy condition at the INC termination. If the call completes, then the originating INC switch issues a billing record, at block 86, and returns to block 60 to await another call.

If the call does not complete, then the call is released back to the originating INC switch, at block 88, and the INC switch issues another query to the SCP/RRP for an overflow route, at block 90. The SCP and RRP perform call processing to determine an overflow route. If no overflow route exists, then call treatment is applied by the INC switch, at block 94, and returns to block 60 to await another call. Call treatment usually involves blocking the call and playing a recorded message to the caller.

If, at decision block 92, an overflow route exists, the INC switch routes the call accordingly, at block 82. The loop initiated with the test of decision block 84 is repeated until the call completes or no further overflow routing is available for the call.

The present invention thus provides a system for and method of routing international calls in compliance with regulatory routing requirements, making the most efficient use of an INC's private network. The invention provides a trigger mechanism in the NCS/SCP process that transfers call processing to the RRP to force calls that were intended to be routed on-net, to off-net routing, in accordance with RR requirements. Additionally, the present invention provides call processing that determines maximum on-net routing allowed in compliance with RR requirements and that is based on call service type.

The present invention is vital to any international carrier, in that it provides an automated, real-time system for routing calls in compliance with regulatory routing requirements. At the same time, it minimizes the costs of routing a call by determining the maximum transport allowed on the carrier's private network. This is important in the current global telecommunications environment in that profit margins may be very slim. The present invention allows an INC to offer special rates, by minimizing network routing costs.

What is claimed is:

1. A method of routing switched termination calls in accordance with regulatory routing requirements set forth in international agreements, which comprises the steps of:
   receiving a call;
   determining whether the call is a switched termination call;
   if said call is a switched termination call, determining an optimal route for the switched termination call in accordance with said regulatory routing requirements by determining the longest route on which the call can be transported on a carrier's private network; and,
   routing the switched termination call in accordance with the optimal route.

2. The method as claimed in claim 1, wherein said step of determining an optimal route for the switched termination call in accordance with said regulatory routing requirements includes the step of:
   searching a database of regulatory routing requirements, said database including routing requirements for calls from originating countries to terminating countries.

3. The method as claimed in claim 2, wherein said database includes routing requirements for calls of various access types from originating countries to various egress types in terminating countries, and wherein said call is of a designated access type from a first country to a designated egress type in a second country, and said step of determining an optimal route for the call in accordance with regulatory routing requirements includes the step of:
   selecting from said database routing requirements for calls of said designated access type originating in said first country and of said designated egress type terminating in said second country.

4. The method as claimed in claim 1, including the steps of:
   determining whether the switched termination call was completed;
   in response to a determination that the switched termination call was not completed, determining whether an overflow route is available for said switched termination call; and,
   in response to a determination that an overflow route is available, routing said switched termination call in an available overflow route.

5. The method as claimed in claim 4, including the step of:
   in response to a determination that the switched termination call was completed, issuing a billing record for said switched termination call.

6. The method as claimed in claim 4, including the step of:
   in response to a determination that an overflow route is not available, applying call treatment to said switched termination call.

7. The method as claimed in claim 1, wherein said step of determining an optimal route for the switched termination call in accordance with regulatory routing requirements includes the step of:
   determining an optimal route for said switched termination call based on call service type.

8. A method of routing telephone calls that originate in a first country and terminate in a second country in accordance with international regulatory routing requirements set forth in international agreements, which comprises the steps of:
   receiving a call at a first switch of a private network of an international carrier;
   sending a query from said first switch to a service control point of said international carrier, said query identifying at least said first country as the country of origin for said call and said second country as the country of termination for said call;
   determining in said service control point from said query that said call is an international call;
   sending a request for a routing translation from said service control point to a regulatory routing platform of said international carrier;

determining in said regulatory routing platform an optimal route for the international call in accordance with said international regulatory routing requirements by determining the longest route on which the call can be transported on said international carrier's private network;

returning from said regulatory routing platform to said service control point a routing translation for said optimal route;

returning from said service control point to said first switch said routing translation; and, routing said international call in accordance with said optimal route.

9. The method as claimed in claim 8, wherein said first switch is located in said first country.

10. The method as claimed in claim 8, wherein said first switch is located in a third country.

11. The method as claimed in claim 10, including the steps of:

receiving said call at a facility of said international carrier in said first country; and, sending said call from said facility of said international carrier to said first switch.

12. The method as claimed in claim 11, wherein said call is sent from said facility of said international carrier to said first switch on a traffic trunk of said international carrier.

13. The method as claimed in claim 11, wherein said step of routing said international call includes the step of:

sending said international call from said first switch to a facility of said international carrier in said second country.

14. The method as claimed in claim 8, wherein said step of determining an optimal route for the international call in accordance with international regulatory routing requirements includes the step of:

searching a database of international regulatory routing requirements, said database including routing requirements for calls from originating countries to terminating countries.

15. The method as claimed in claim 14, wherein said database includes routing requirements for calls of various access types from originating countries to various egress types in terminating countries, and wherein said call is of a designated access type and a designated egress type, and said step of determining an optimal route for the international call in accordance with international regulatory routing requirements includes the step of:

selecting from said database routing requirements for calls of said designated access type originating in said first country and of said designated egress type terminating in said second country.

16. A system for routing telephone calls that originate in a first country and terminate in a second country in accordance with international regulatory routing requirements set forth in international agreements, which comprises:

a first switch of a private network of an international carrier;

a service control point of said international carrier;

means for sending a query from said first switch to said service control point, said query identifying at least said first country as the country of origin for said call and said second country as the country of termination for said call;

means for determining from said query that said call is an international call;

a regulatory routing platform of said international carrier;

means for sending a request for a routing translation from said service control point to said regulatory routing platform;

means for determining in said regulatory routing platform an optimal route for the international call in accordance with said international regulatory routing requirements by determining the longest route on which the call can be transported on said international carrier's private network;

means for returning from said regulatory routing platform to said service control point a routing translation for said optimal route;

means for returning from said service control point to said first switch said routing translation; and, means for routing said international call in accordance with said optimal route.

17. The system as claimed in claim 16, wherein said first switch is located in said first country.

18. The system as claimed in claim 16, wherein said first switch is located in a third country.

19. The system as claimed in claim 17, including:

a facility of said international carrier in said first country for receiving said call; and, means for sending said call from said facility of said international carrier to said first switch.

20. The system as claimed in claim 19, wherein said means for sending said call from said facility of said international carrier to said first switch includes a traffic trunk of said international carrier.

21. The method as claimed in claim 19, wherein said means for routing said international call includes:

means for sending said international call from said first switch to a facility of said international carrier in said second country.

* * * * *